United States Patent [19]

Takahashi

[11] Patent Number: 5,577,846
[45] Date of Patent: Nov. 26, 1996

[54] ECCENTRIC ROLLING BEARING DEVICE

[75] Inventor: Kenji Takahashi, Osaka, Japan

[73] Assignee: Koyo Seiko, Co., Ltd., Osaka, Japan

[21] Appl. No.: 461,378

[22] Filed: Jun. 5, 1995

Related U.S. Application Data

[63] Continuation-in-part of Ser. No. 38,935, Mar. 29, 1993, abandoned.

[30] Foreign Application Priority Data

Mar. 30, 1992 [JP] Japan ................. 4-017625 U

[51] Int. Cl.⁶ ..................... F16C 33/58; F16C 19/50
[52] U.S. Cl. ................. 384/492; 384/447; 384/449; 384/569; 384/625
[58] Field of Search ................. 384/50, 52, 55, 384/58, 447, 449, 480, 492, 513, 548, 565, 569, 625

[56] References Cited

U.S. PATENT DOCUMENTS

| | | | |
|---|---|---|---|
| 3,239,290 | 3/1966 | Benson et al. | 384/447 |
| 4,054,339 | 10/1977 | Ladin | 384/569 |
| 4,829,950 | 5/1989 | Kanamaru et al. | 123/90.51 |
| 4,871,268 | 10/1989 | Furumura et al. | 384/912 X |
| 4,964,742 | 10/1990 | Kagawa et al. | 384/492 X |
| 4,983,100 | 1/1991 | Budecker | 417/271 |
| 5,064,298 | 11/1991 | Hibi | 384/565 X |
| 5,094,599 | 3/1992 | Budecker | 417/534 |
| 5,100,305 | 3/1992 | Zirps | 417/521 |
| 5,116,144 | 5/1992 | Kamiya et al. | 384/625 X |
| 5,230,275 | 7/1993 | Hodge et al. | 384/585 X |

FOREIGN PATENT DOCUMENTS

| | | |
|---|---|---|
| 56-127382 | 9/1981 | Japan . |
| 58-175174 | 11/1983 | Japan . |
| 64-368 | 1/1989 | Japan . |
| 2-146220 | 12/1990 | Japan . |
| 3-253241 | 11/1991 | Japan . |
| 4-327019 | 11/1992 | Japan ................. 384/565 |
| 2216200 | 10/1989 | United Kingdom ................. 384/492 |

*Primary Examiner*—Thomas R. Hannon
*Attorney, Agent, or Firm*—Popham, Haik, Schnobrich & Kaufman, Ltd.

[57] ABSTRACT

In a rolling bearing device mounted on an eccentric mounting shaft, its outer race ring is formed by pressing, and the outer cylindrical surface thereof is left as it is, not polished. Hence, an oil film is stably formed on the whole outer cylindrical surface of the outer race ring, which is a cam surface, thus preventing the cam surface from being seized or worn out. The outer race has a diameter "D" and a radial thickness "t", and the outer race has a large radial thickness which is accomplished by providing that the diameter "D" and the radial thickness "t" satisfy a formula $t/D \geq 0.07$.

11 Claims, 3 Drawing Sheets

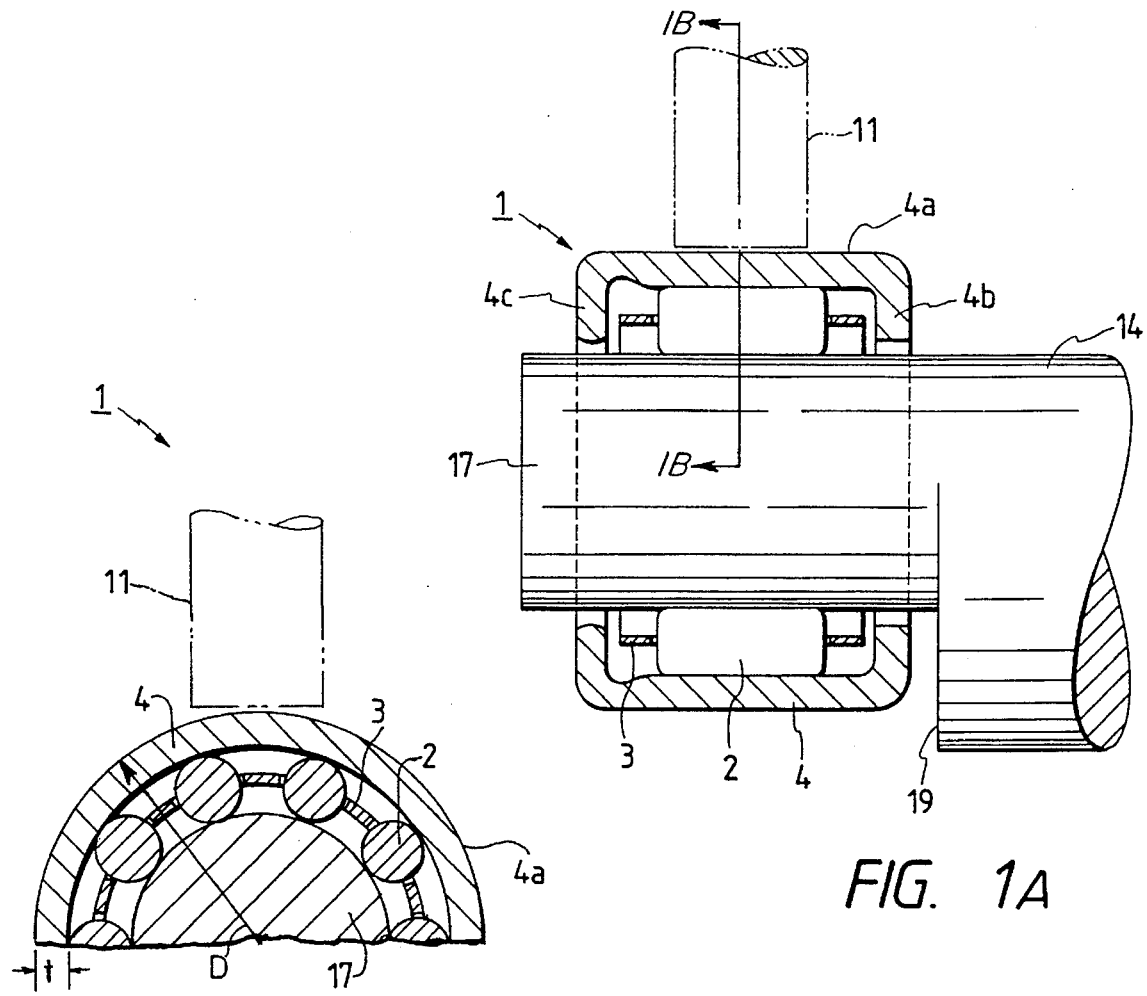
FIG. 1A
FIG. 1B
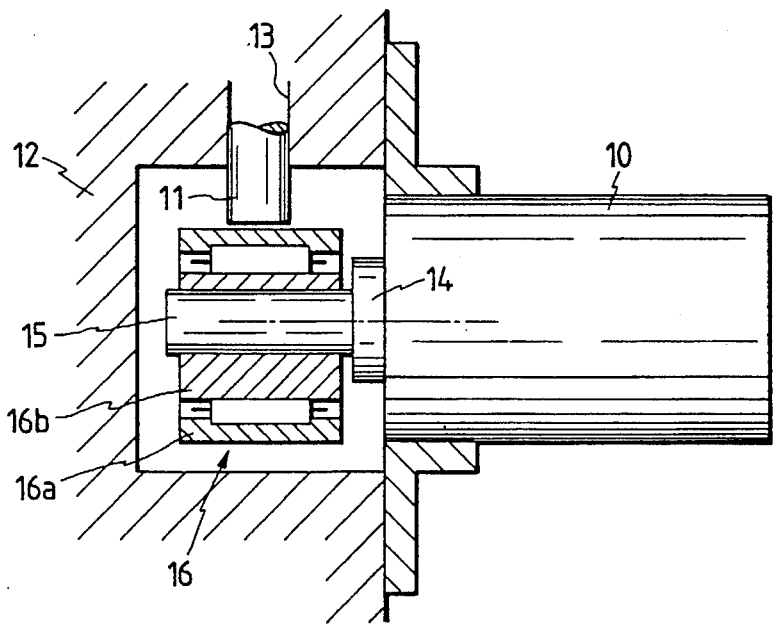
FIG. 2
PRIOR ART

ECCENTRIC ROLLING BEARING DEVICE

This is a continuation-in-part of U.S. patent application Ser. No. 08/038,935, filed Mar. 29, 1993 now abandoned.

BACKGROUND OF THE INVENTION

1. Technical Field

This invention relates to an eccentric rolling bearing device for a pumping mechanism employed, for instance, in the anti-skid device of a motor vehicle.

2. Description of the Related Art

The anti-skid device of a motor vehicle operates as follows: When the motor vehicle is braked hard or its is braked while travelling on a slippery road, the device pumps up the hydraulic pressure applied to the wheel cylinders, to prevent brake locking thereby to prevent the slip of the vehicle. The device includes a pumping mechanism for pumping the hydraulic pressure.

FIGS. 2 and 3 show examples of a conventional pumping mechanism. Each of the pumping mechanism converts a rotational motion of a motor 10 into a reciprocating motion of a plunger 11, to perform a pumping action. The plunger 11 is slidably inserted into a cylinder 13 formed in a housing 12.

The pumping mechanism shown in FIG. 2 is designed as follows: An eccentric rolling bearing 16 serving as a cam is mounted on a mounting shaft 15 which is integral with and coaxial with the drive shaft 14 of the motor 10. The bearing 16 comprises an outer race ring 16a and an inner race ring 16b. The outer cylindrical surface of the outer race ring 16 is a cam surface which is in contact with the plunger 11. The inner race ring 16b has an shaft hole at an eccentric position. (cf. Japanese Patent Application (OPI) No. 146220/1990 (the term "OPI" as used herein means an "unexamined published application")

In the conventional pumping mechanism shown in FIG. 3, in which parts corresponding functionally to those which have been described with reference to FIG. 2 are therefore designated by the same reference numerals or characters, a mounting shaft 17 is extended from the drive shaft 14 of the motor 10 in such a manner that it is off-centered (hereinafter referred to as "an eccentric mounting shaft", when applicable), and an ordinary rolling bearing 18 with no inner race ring is mounted on the eccentric shaft 17. In the pumping mechanism, as the eccentric mounting shaft 17 is rotated eccentrically, the rolling bearing 18 is rotated eccentrically as a whole. The outer race ring 18a of the rolling bearing 18 provides a cam surface, with which the plunger 11 is held in slide contact.

In the above-described two conventional pumping mechanisms, the rolling bearings 16 and 18 have the outer race rings 16a and 18a of the rolling bearings 16 and 18 are formed by machining, and they are relatively large in wall thickness. The outer cylindrical surfaces of the outer race rings 16a and 18a are polished. During this polishing operation, a number of stripes 20 are formed in the outer cylindrical surfaces of the outer race rings 16 and 18 in the circumferential direction. Those stripes can be readily observed under a microscope. Hence, the lubricant on the outer cylindrical surface of each of the outer race rings 16 and 18 is divided into a number of parts axially by the stripes; that is, the stripes thus formed make it difficult to form a film of lubricant on the outer cylindrical surface. As a result, the outer cylindrical surface may be seized or worn out where it is in contact with the plunger 11.

SUMMARY OF THE INVENTION

Accordingly, an object of this invention is to eliminate the above-described difficulties accompanying a conventional eccentric rolling bearing.

More specifically, an object of the invention is to provide an eccentric rolling bearing device in which an oil film is stably formed on the entire outer cylindrical surface of its outer race ring serving as a cam surface, whereby the outer cylindrical surface is prevented from being seized or worn out.

The foregoing object and other objects of the invention have been achieved by the provision of an eccentric rolling bearing device comprising: an eccentric rotary shaft; a plurality of rolling elements arranged around the eccentric rotary shaft; and an outer race ring having an inner surface in which a roller track is formed for the rolling elements and an outer surface which is formed into a cylindrical cam surface, in which, according to the invention, the cylindrical cam surface of the outer race ring has a plurality of fine recesses, and the outermost surface thereof is planar and smooth. The outer race member has a diameter "D" and a radial thickness "t" which satisfy a formula $t/D \geq 0.07$.

The nature, principle, and utility of the invention will be more clearly understood from the following detailed description of the invention when read in conjunction with the accompanying drawings.

BRIEF DESCRIPTION OF THE DRAWING(S)

In the accompanying drawings:

FIG. 1A is a sectional view of an example of an eccentric rolling bearing device, which constitutes an embodiment of this invention;

FIG. 1B is a sectional view of the eccentric rolling bearing device of FIG. 1A, taken along line 1B—1B of FIG. 1A, and showing the radial thickness "t" and the diameter "D" of the outer race.

FIG. 2 is a sectional view showing a pumping mechanism with a conventional eccentric rolling bearing;

DETAILED DESCRIPTION OF THE INVENTION

Preferred embodiments of this invention will be described with reference to the accompanying drawings.

Figure 3:
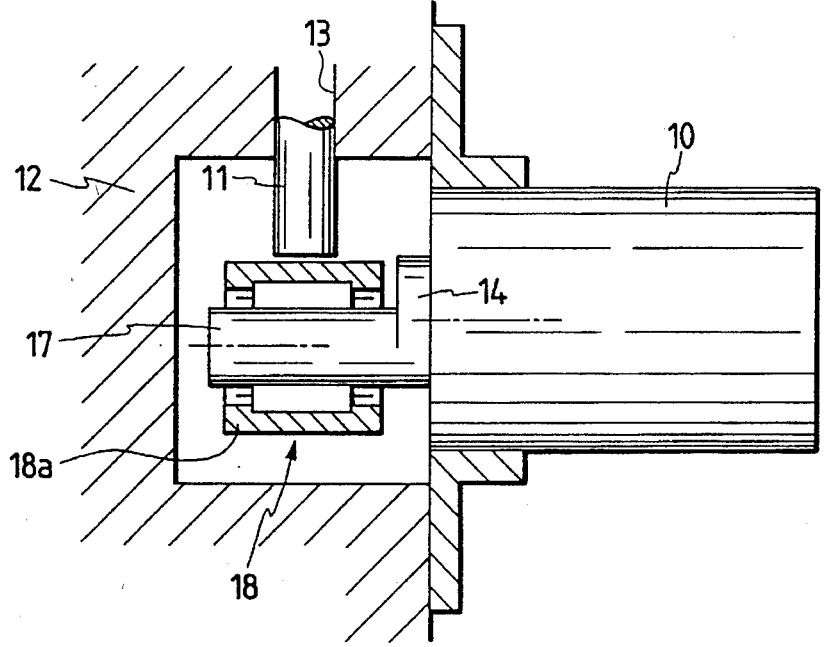
FIG. 3 is a sectional view showing a pumping mechanism with another conventional eccentric rolling bearing.

As shown in FIGS. 1A and 1B, a rolling bearing device 1, which constitutes one embodiment of the invention, is mounted on an eccentric mounting shaft 17 which is integral with the drive shaft 14 of an electric motor 10, similarly as in the case of the conventional rolling bearing shown in FIG. 3. The rolling bearing device 1 is of a shell type, comprising needle rollers 2, a cage 3, and an outer race ring 4 embracing the rollers 2 and the cage 3.

The outer cylindrical surface 4a of the outer race ring 4 is a cylindrical cam surface which is brought into contact with a plunger 11. The outer race 4 is likely to be deformed due to the load from the plunger 11, to generate tensile stress on the radially inner side of the outer race 4. Thus, in the present invention, the outer race 4 is designed to have a large radial thickness to prevent damage and breakage of the outer race 4, even in the case that such deformation occurs. Specifically, the outer race 4 has a diameter "D" and a radial thickness "t", and the large radial thickness is accomplished by providing that the diameter "D" and the radial thickness "t" satisfy a formula $t/D \geq 0.07$.

Figure 4A:
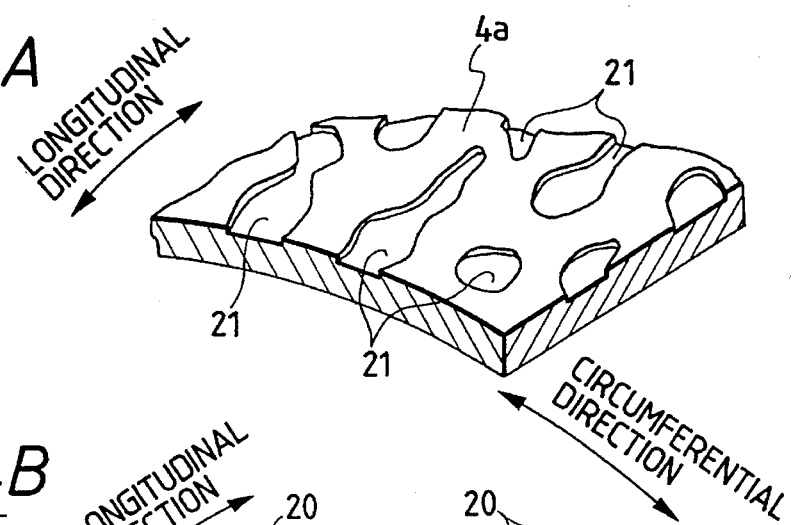
FIG. 4A is an explanatory diagram showing the outer cylindrical surface of an outer race ring of the eccentric rolling bearing device which is formed by pressing.
Figure 4B:
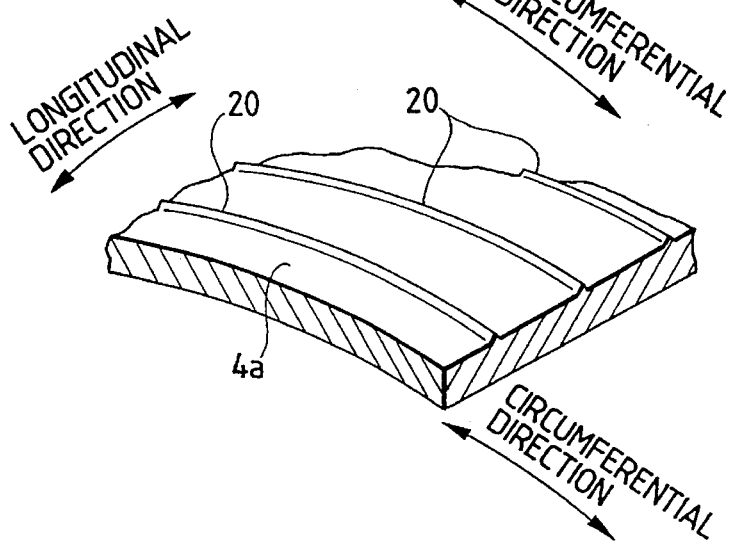
FIG. 4B is an explanatory diagram showing an outer race ring of the conventional eccentric rolling bearing which is formed by machining.

As shown in FIG. 4A, a plurality of fine recesses are formed in the outer cylindrical surface 4a which is smooth. That is, the outermost surface of the outer race ring is smooth. In order to form the fine recesses in the smooth outer cylindrical surface 4a, it is preferable to form the outer race ring by pressing. The outer race ring 4 has an inner annular flange 4b and an outer annular flange 4c at both ends. The inner cylindrical edges of the inner annular flange 4b and the outer annular flange 4c form labyrinth seals, being set close to the eccentric mounting shaft 17. The inside of the outer race ring 4 is filled with a lubricant such as grease.

A method of manufacturing the rolling bearing device thus constructed will be described with reference to FIGS. 5A through 5E.

Figure 5A:
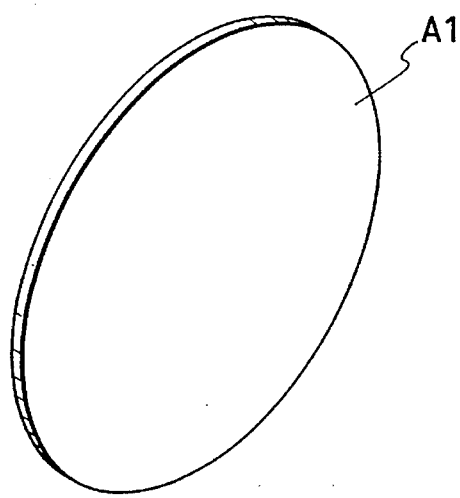
FIGS. 5A through 5D are explanatory diagrams for a description of a method of manufacturing the outer race ring of the eccentric rolling bearing device according to the invention.
Figure 5B:
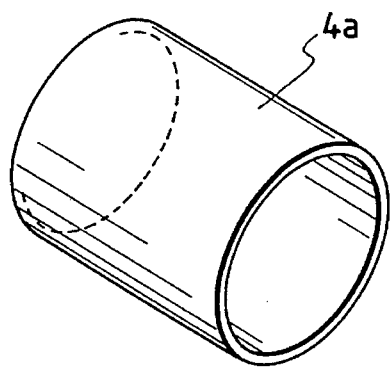
Figure 5C:
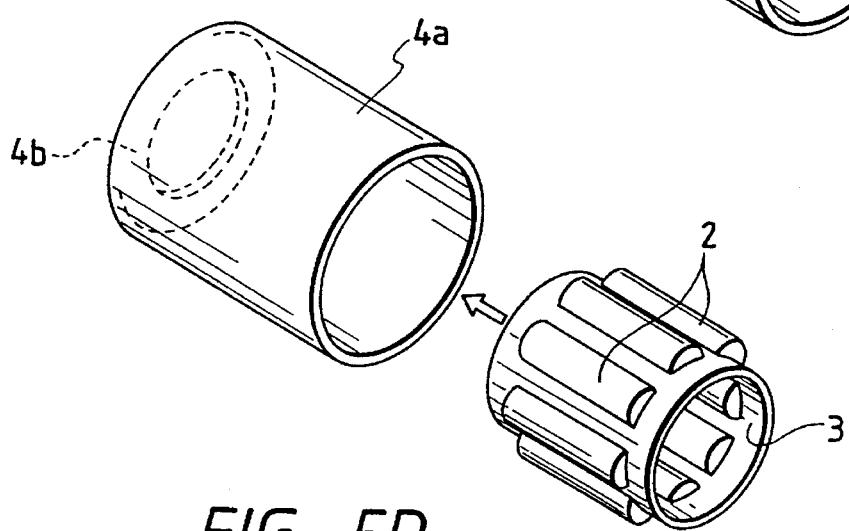
Figure 5D:
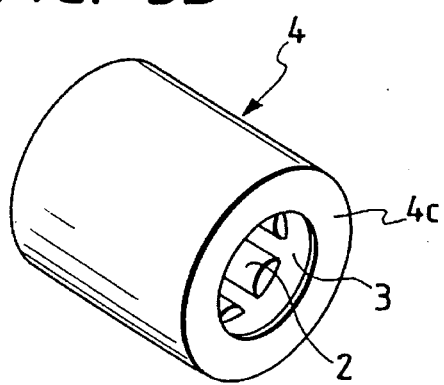

First, as shown in FIG. 5A, an alloy steel plate of carbon steel or SCM material (chrome-molybdenum steel) is prepared. The alloy steel plate is a bright material (polished) which is 0.4 to 3S in surface finish (JIS B0601). The plate is drawn on a press to form a cup as shown in FIG. 5B. In this drawing operation, it is desirable that the portion of the cup which is to be formed into the annular flange 4c, and its base end portion are smaller in wall thickness than the other portions. Thereafter, as shown in FIG. 5C, the other annular flange 4b is formed by drilling a round hole in the bottom of the cup. The cup thus processed is quenched, so that it is increased in mechanical strength. Thereafter, the portion of the cup which is to be formed into the annular flange 4c is tempered. Next, the needle rollers 2 and the cage 3 are fitted into the cup. Under this condition, the portion tempered is bent to form the annular flange 4c as shown in FIG. 5D. Thus, the needle rollers 2 and the cage or retainer 3 are held in the outer race ring 4.

The outer cylindrical surface 4a of the outer racer ring 4 thus formed by pressing is left as it is; that is, it is not polished. Therefore, the outer cylindrical surface 4a has fine ridges and recesses (being Rz 2 to 3 in maximum roughness). However, the ridges and recesses 21 are not directional, and the ridges are not continuous to one another in the circumferential direction of the outer race ring. Hence, the lubricant on the outer cylindrical surface 4a spreads readily, thus forming an oil film over the whole outer cylindrical surface 4a of the outer race ring 4. In addition, the ends of the ridges formed in the outer cylindrical surface 4a are not sharp being flattened by the pressing die, which provides satisfactory lubrication between the outer race ring and the plunger. On the other hand, the inner cylindrical surface of the outer race ring, in which a roller race is formed, is larger in roughness than the outer cylindrical surface, because it is formed by the punch which is used in combination with the die in the pressing operation.

Because the outer race 4 of the present invention is thick (i.e. the diameter "D" and the radial thickness "t" satisfy a formula $t/D \geq 0.07$), the surface portion of the race member 4 can be hardened while the internal, deep portion thereof remains soft (HRC 10 or less) if the outer race member is made of low-carbon steel and subjected to a carburizing quenching process. Therefore, in the present invention, SCM material is preferred as the material for the thick outer race 4 to secure the hardness entirely over the radial thickness to bear against the load from the plunger 11. Using SCM material, a surface hardness of HRC 60-64 and an internal hardness of HRC 30-47 can be attained.

If the eccentric rolling bearing device of the invention is shifted axially, then the end of the outer race ring 4 may be brought into slide contact with the step 19 formed between the eccentric mounting shaft 17 and the drive shaft 14. However, in the rolling bearing device, the annular flanges 4b and 4c, which are located at both end of the outer race ring 4, are made relatively large in radial width. Hence, in the eccentric rolling bearing device, the pressure provided when the outer race ring 4 is brought into contact with the step 19 is lower than in the case of the conventional rolling bearing. Thus, the end portion, in the axial direction, of outer race ring 4 is scarcely worn out.

Furthermore, since the needle rollers 2 and the cage 3 are surrounded by the outer race ring 4, the lubricant is kept inside the roller bearing device; that is, it is prevented from splashing out of the roller bearing device. This will provide enough lubrication between the roller bearing unit and the eccentric mounting shaft 17.

As was described above, an oil film can be stably formed on the whole outer cylindrical surface of the outer race ring, which is the cam surface with which the plunger is held in slide contact, whereby the outer cylindrical surface is prevented from being seized or worn out by the slide contact of the plunger.

In the above-described embodiment, the eccentric mounting shaft 17 is an eccentric rotary shaft, and the needle rollers 2 and the cage 3 are rolling elements which are arranged around the eccentric rotary shaft; however, it should be noted that the invention is not limited thereto or thereby. That is, the technical concept of the invention may be applied to an eccentric rolling bearing device in which, similarly as in the conventional eccentric roller bearing shown in FIG. 2, the eccentric rotary shaft is made up of a mounting shaft which is coaxial with the drive shaft of the motor, and an inner race ring mounted on the mounting shaft through a shaft hole which is not coaxial with the latter. In addition, the rolling elements may be provided without the cage 3.

In the case where, similarly as in the case of the conventional eccentric rolling bearing, the eccentric rolling bearing device of the invention is applied to a hydraulic pressure unit in the anti-skid device of a motor vehicle, the eccentric mounting shaft 17 and the drive shaft 19 correspond to the output shaft of the electric motor in the hydraulic unit, and the plunger 11 is the plunger of the pumping mechanism. However, it should be noted that the application of the rolling bearing device of the invention is not limited to the pumping mechanism only.

In the embodiment, the rolling element is a roller. Again, the present invention should not be restricted thereto or thereby. The rolling element may be a ball.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A rolling bearing device comprising:

an eccentric rotary shaft;

a plurality of rolling elements arranged around said eccentric rotary shaft, said rolling elements comprising a cage and needle rollers held by said cage; and an outer race ring made of chrome-molybdenum steel material and having a diameter "D" and a radial thickness "t", said outer race ring being formed by pressing and having an inner surface in which a roller track is formed for said rolling elements and an outer surface which is formed into a cylindrical cam surface, in which:

said cylindrical cam surface has a plurality of fine recesses, and the outermost surface thereof is smooth; and said diameter "D" and said radial thickness "t" satisfy a formula $t/D \geq 0.07$.

2. A rolling bearing device as claimed in claim 1, in which said outer race ring is not polished.

3. A rolling bearing device as claimed in claim 1, in which said rotary shaft is the output shaft of an electric motor provided for an hydraulic pressure unit, and the plunger of said hydraulic pressure unit is held in contact with said cam surface of said outer race ring.

4. A rolling bearing device as claimed in claim 1, wherein said outer race ring has an internal hardness of HRC 30-47 achieved by subjecting said outer race ring to a carburizing quenching process.

5. A rolling bearing device as claimed in claim 1, wherein said cylindrical cam surface also has a plurality of fine ridges, and wherein said ridges and recesses are not directional, and said ridges are not continuous with one another in the circumferential direction of said outer race ring.

6. A rolling bearing device comprising:

an eccentric rotary shaft;

a plurality of rolling elements arranged around said eccentric rotary shaft, said rolling elements comprising a cage and needle rollers held by said cage; and an outer race ring made of chrome-molybdenum steel material and having a diameter "D" and a radial thickness "t", said outer race ring being formed by pressing and having an inner surface in which a roller track is formed for said rolling elements, an outer surface which is formed into a cylindrical cam surface, a pair of opposed ends, and flanges at both ends which are formed by bending both ends inwardly, in which:

said cylindrical cam surface has a plurality of fine recesses, and the outermost surface thereof is smooth;

said diameter "D" and said radial thickness "t" satisfy a formula $t/D \geq 0.07$; and said flanges both have an inner cylindrical edge, said inner cylindrical edges forming labyrinth seals set close to said eccentric rotary shaft.

7. A rolling bearing device as claimed in claim 6, in which said outer race ring is not polished.

8. A rolling bearing device as claimed in claim 6, in which said rotary shaft is the output shaft of an electric motor provided for an hydraulic pressure unit, and the plunger of said hydraulic pressure unit is held in contact with said cam surface of said outer race ring.

9. A rolling bearing device as claimed in claim 6, wherein said outer race ring has an internal hardness of HRC 30-47 achieved by subjecting said outer race ring to a carburizing quenching process.

10. A rolling bearing device as claimed in claim 6 wherein said cylindrical cam surface also has a plurality of fine ridges, and wherein said ridges and recesses are not directional, and said ridges are not continuous with one another in the circumferential direction of said outer race ring.

11. A rolling bearing device as claimed in claim 6, in which a space defined by said outer race ring and said rotary shaft is filled with a lubricant.

* * * * *